US011505669B2

(12) United States Patent
Kohlstrung et al.

(10) Patent No.: US 11,505,669 B2
(45) Date of Patent: Nov. 22, 2022

(54) THERMALLY EXPANDABLE COMPOSITIONS COMPRISING UREA DERIVATIVES

(71) Applicant: Henkel AG & Co. KGaA, Duesseldorf (DE)

(72) Inventors: Rainer Kohlstrung, Plankstadt (DE); Klaus Rappmann, Weinheim-Rittenweier (DE); Sascha Poeller, Bochum (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 742 days.

(21) Appl. No.: 15/935,196

(22) Filed: Mar. 26, 2018

(65) Prior Publication Data

US 2018/0215888 A1 Aug. 2, 2018

Related U.S. Application Data

(63) Continuation of application No. PCT/EP2016/073065, filed on Sep. 28, 2016.

(30) Foreign Application Priority Data

Sep. 28, 2015 (EP) .................................... 15187182

(51) Int. Cl.
| | | |
|---|---|---|
| C08J 9/08 | (2006.01) | |
| C08J 9/00 | (2006.01) | |
| B29C 44/18 | (2006.01) | |
| C08L 23/08 | (2006.01) | |
| B29C 44/34 | (2006.01) | |
| C09K 3/10 | (2006.01) | |
| B29K 23/00 | (2006.01) | |
| B29K 105/24 | (2006.01) | |
| B62D 29/00 | (2006.01) | |
| B29K 105/04 | (2006.01) | |
| B29L 31/30 | (2006.01) | |

(52) U.S. Cl.
CPC ............... *C08J 9/08* (2013.01); *B29C 44/188* (2013.01); *B29C 44/3415* (2013.01); *C08J 9/0014* (2013.01); *C08J 9/0023* (2013.01); *C08J 9/0028* (2013.01); *C08J 9/0061* (2013.01); *C08L 23/0853* (2013.01); *C08L 23/0884* (2013.01); *C09K 3/10* (2013.01); *B29K 2023/083* (2013.01); *B29K 2105/04* (2013.01); *B29K 2105/24* (2013.01); *B29L 2031/30* (2013.01); *B62D 29/002* (2013.01); *C08J 2201/024* (2013.01); *C08J 2201/026* (2013.01); *C08J 2203/02* (2013.01); *C08J 2207/00* (2013.01); *C08J 2207/02* (2013.01); *C08J 2300/10* (2013.01); *C08J 2323/02* (2013.01); *C08J 2323/08* (2013.01); *C08J 2323/16* (2013.01); *C08J 2331/04* (2013.01); *C08J 2333/02* (2013.01); *C08J 2333/06* (2013.01); *C08J 2353/02* (2013.01); *C08J 2423/08* (2013.01); *C08J 2433/06* (2013.01); *C08L 2203/14* (2013.01); *C08L 2312/00* (2013.01); *C09K 2003/1059* (2013.01); *C09K 2003/1068* (2013.01); *C09K 2200/0622* (2013.01)

(58) Field of Classification Search
CPC .......................... B29C 44/188; B29C 44/3415
USPC ........................................................ 264/267
See application file for complete search history.

(56) References Cited

U.S. PATENT DOCUMENTS

| | | | | |
|---|---|---|---|---|
| 3,798,188 A | * | 3/1974 | Takizawa et al. | ......... C08J 9/06 521/94 |
| 4,692,427 A | | 9/1987 | Pastornio et al. | |
| 9,637,067 B2 | | 5/2017 | Kohlstrung et al. | |
| 2008/0265516 A1 | * | 10/2008 | Walker | ................... C08J 9/0061 277/316 |
| 2009/0239962 A1 | * | 9/2009 | Dobashi | ..................... C08J 9/06 521/95 |
| 2013/0078445 A1 | | 3/2013 | Ramesh et al. | |
| 2014/0020910 A1 | | 1/2014 | Falkner et al. | |
| 2014/0131910 A1 | | 5/2014 | Kohlstrung et al. | |
| 2017/0002164 A1 | | 1/2017 | Kohlstrung et al. | |

FOREIGN PATENT DOCUMENTS

| | | |
|---|---|---|
| CN | 102226015 A | 10/2011 |
| CN | 102532647 A | 7/2012 |
| CN | 103205124 A | 7/2013 |

(Continued)

OTHER PUBLICATIONS

International Search Report for PCT/EP2016/073065, dated Nov. 4, 2016. All references cited in the International Search Report are listed herein.

(Continued)

*Primary Examiner* — Christina A Johnson
*Assistant Examiner* — Xue H Liu
(74) *Attorney, Agent, or Firm* — Mary K. Cameron

(57) ABSTRACT

The present application relates to a thermally expandable composition containing at least one peroxide cross-linking polymer, at least one peroxide and at least one endothermic, chemical blowing agent, the blowing agent comprising at least one solid, optionally functionalized, polycarboxylic acid or the salt thereof and at least one urea derivative according to the formula (I) as defined herein; as well as shaped bodies containing the composition and to a method for sealing and filling voids in components, for strengthening or reinforcing components, in particular hollow components, and for bonding mobile components using shaped bodies of this type.

20 Claims, No Drawings

(56) References Cited

FOREIGN PATENT DOCUMENTS

| | | |
|---|---|---|
| CN | 103756111 A | 4/2014 |
| DE | 2018536 B2 | 7/1976 |
| DE | 102012221192 A1 | 5/2014 |
| GB | 1346676 A | 2/1974 |
| JP | S5898341 A | 6/1983 |
| JP | 63150335 A | 6/1988 |
| JP | H11286570 A | 10/1999 |
| JP | 2000143862 A | 5/2000 |
| JP | 2002317067 A | 10/2002 |
| JP | 2002322306 A | 11/2002 |
| JP | 2603012844 A | 1/2003 |
| JP | 2008162022 A | 7/2008 |
| JP | 2008208341 A | 9/2008 |
| JP | 2010047709 A | 3/2010 |
| JP | 2010513604 A | 4/2010 |
| WO | 2007039309 A1 | 4/2007 |
| WO | 2008021200 A1 | 2/2008 |
| WO | 2008034755 A1 | 3/2008 |
| WO | 2013017536 A1 | 2/2013 |
| WO | 2014060205 A1 | 4/2014 |
| WO | 2015140282 A1 | 9/2015 |
| WO | 2016058887 A1 | 4/2016 |

OTHER PUBLICATIONS

International Search Report for PCT/EP2016/073067, mailed 2016/12/01. All references cited in the International Search Report are listed herein.

M.A. Rodriguez-Perez et al., "Foaming of EVA/Starch Blends: Characterization of the Structure, Physical Properties, and Biodegradability", Polymer Engineering and Science, Bd. 52, Nr. 1, 15. Jul. 15, 2011, pp. 62-70, XP055244916, U.S. ISSN: 0032-3888, DOI: 10.1002/pen.20046 das ganze Dokument.

Hitoshi Kondo, "The Characteristic of Foaming Agents", Journal of The Society of Rubber Industry, Japan, The Society of Rubber Science and Technology, Japan, Oct. 31, 2001, vol. 74, No. 10, p. 58-63.

* cited by examiner

THERMALLY EXPANDABLE COMPOSITIONS COMPRISING UREA DERIVATIVES

The present application relates to a thermally expandable composition, comprising at least one peroxidically cross-linking polymer, at least one peroxide and at least one endothermic chemical blowing agent, to shaped bodies comprising this composition, and to a method for sealing and filling cavities in components, for reinforcing or stiffening components, in particular hollow components, and for bonding movable components using such shaped bodies.

Modern automobiles and automobile parts have a multitude of cavities, which must be sealed to prevent the ingress of moisture and contaminants, as this can lead to corrosion on the corresponding body parts from within. This applies in particular to a modern integral body construction, in which a heavy frame construction is replaced with lightweight, structurally stable frame structures made of prefabricated hollow profiles. This kind of construction has a number of system-inherent cavities, which must be sealed to prevent the ingress of moisture and contaminants. Such sealing furthermore is used to avoid the transmission of airborne sound and structure-borne sound in such cavities and thereby reduce unpleasant vehicle running and wind noise, so as to thus increase the driving comfort in the vehicle.

Baffle parts that cause a sealing and/or acoustic effect in such cavities are frequently referred to as cavity sealing systems, pillar fillers, baffles or acoustic baffles. They are generally made entirely of thermally expandable molded bodies or of molded bodies that comprise a carrier and polymeric compositions expandable in the peripheral region. These baffle parts are secured in the body in white to the open structures by way of mounting, clipping, bolting or welding. After the structures in the body in white have been closed and further pretreatments of the body have been carried out, the process heat from the furnaces for curing the cathodic dip coating is used to trigger the expansion of the expandable portion of the baffle part, so as to seal the cross-section of the cavity.

Modern vehicles increasingly need metallic and/or plastic-based lightweight components to ensure consistently dimensionally accurate high-volume production having pre-defined rigidity and structural stability. In vehicle construction in particular there is a need, within the scope of the desired weight savings, for metallic lightweight components made of thin-walled metal sheets, which nonetheless offer sufficient rigidity and structural stability. Shaped bodies made of thermally expandable compositions, which impart the necessary supporting properties, are used here as well.

Corresponding thermally expandable compositions are described in documents WO 2008/034755, WO 2007/039309, WO 2013/017536, and the German application 10 2012 221 192.6, for example. These thermally expandable compositions are also used in the automotive field.

Today, exothermic blowing agents, such as ADCA (azodicarbonamide), OBSH (4,4'-oxybis(benzenesulfonic acid hydrazide)), DNPT (dinitroso pentamethylene tetramine), PTSS (p-toluenesulfonyl semicarbazide), BSH (benzene-4-sulfonyl hydrazide), TSH (4-toluenesulfonyl hydrazide), 5-PT (5-phenyltetrazole) and the like, are used in these expandable compositions, such as vulcanized rubber (sulfur, peroxide or benzoquinone dioximes), for sealing and bonding, ethylene vinyl acetate-based baffles, epoxide-based supporting foams and expandable sealing compounds in the construction of automobiles.

These blowing agents have the disadvantage that they can trigger respiratory sensitivity, are generally not safe from a toxicological point of view, or are explosive. During decomposition, they also give rise to by-products such as ammonia, formamide, formaldehyde or nitrosamines, which according to the Global Automotive Declarable Substance List (GADSL), IFA-KMR List 08/2012 or the BGIA Report "Index of hazardous substances 2012" are prohibited in the construction of automobiles. Additionally, the content of volatile organic compounds (VOCs) is very high when exothermic blowing agents are used.

Due to exothermic decomposition and the very narrow temperature range of the decomposition temperature of the above-mentioned blowing agents, the foam structure furthermore depends on the curing/foaming temperatures, which are usually in the range of 140° C. to 220° C., and may vary quite drastically, depending on the temperature range. This causes the expansion rate and the foam structure to fluctuate between the minimum and maximum process temperatures. The foam structure, in turn, influences the absorption of water at varying curing temperatures, which may be very high particularly in the case of large-pored foams. Effective use of the aforementioned blowing agents is not possible at temperatures below 140° C.

With respect to water absorption, it is very important to minimize water absorption to as great an extent as possible, especially when used in the automotive field. The automotive sector requires low water absorption to achieve improved corrosion resistance and long-term durability. However, replacing exothermic blowing agents with endothermic blowing agents may result in increased water absorption.

It was therefore the object of the present invention to provide thermally expandable compounds that are able to dispense with the aforementioned exothermic blowing agents, but are similarly suitable for the above-described uses as the known compounds and, above all, have low water absorption.

Surprisingly, this object is achieved by thermally expandable compositions, comprising
a) at least one peroxidically cross-linking polymer;
b) at least one peroxide; and
c) at least one endothermic chemical blowing agent,
wherein the at least one endothermic chemical blowing agent comprises at least one carboxylic acid, and in particular at least one solid, optionally functionalized, polycarboxylic acid or the salt thereof, and at least one urea derivative of formula (I)

$$R_1-NH-C(=X)-NR_2R_3 \qquad (I)$$

where X denotes O or S;
$R_1$, $R_2$ and $R_3$ independently denote H, substituted or unsubstituted alkyl, substituted or unsubstituted heteroalkyl, substituted or unsubstituted cycloalkyl, substituted or unsubstituted aryl or $-C(O)-R_4$, where $R_4$ denotes H or substituted or unsubstituted alkyl.

Corresponding compositions overcome the known disadvantages, while also meeting the requirements that exist for such thermally expandable compositions to a high degree, especially with respect to excellent expansion and low water absorption.

The present invention thus relates to thermally expandable compositions, comprising
a) at least one peroxidically cross-linking polymer;
b) at least one peroxide; and
c) at least one endothermic chemical blowing agent, characterized in that the at least one endothermic chemical blowing agent comprises at least one carboxylic acid, in particular at least one solid, optionally functionalized, polycarboxylic acid or the salt thereof, and at least one urea derivative of formula (I)

where X denotes O or S;
$R_1$, $R_2$ and $R_3$ independently denote H, substituted or unsubstituted alkyl, substituted or unsubstituted heteroalkyl, substituted or unsubstituted cycloalkyl, substituted or unsubstituted aryl or —C(O)—$R_4$, where $R_4$ denotes H or substituted or unsubstituted alkyl.

Endothermic chemical blowing agents have the advantage that they are neither hazardous to people's health nor explosive, and that fewer volatile organic compounds (VOCs) are created during expansion. The decomposition products are essentially $CO_2$ and water. Furthermore, the products manufactured therewith have a more uniform foam structure across the entire process temperature range used for curing. In the present case, this, in combination with the other components of the composition, also yields particularly low water absorption. Finally, compared to conventional exothermic blowing agents, the decomposition temperature of endothermic blowing agents is lower, in particular of mixtures thereof, and consequently the process temperature can be reduced and energy can be saved.

A chemical blowing agent according to the invention shall be understood to mean compounds that decompose under the action of heat, releasing gases in the process.

Monocarboxylic acids, such as acetic acid and propionic acid, are also suitable carboxylic acids. However, solid polycarboxylic acids are particularly preferred. Suitable polycarboxylic acids include, but are not limited to, solid, organic diacids, triacids or tetraacids, in particular hydroxy-functionalized or unsaturated dicarboxylic, tricarboxylic, tetracarboxylic or polycarboxylic acids, such as citric acid, tartaric acid, malic acid, fumaric acid and maleic acid. The use of citric acid is particularly preferred. Citric acid is advantageous, among other things, because it represents an ecologically sustainable blowing agent.

In the case of polycarboxylic acids, these may also be partially esterified, wherein, however, at least one free acid group per molecule remains present at all times. The polycarboxylic acids are preferably esterified with aliphatic alcohols, such as methanol, ethanol, propanol and butanol. The polycarboxylic acids are preferably not esterified.

The salts of the aforementioned acids and mixtures of two or more of the described compounds are also suitable. In the case of salts of the polycarboxylic acids, the counterion is preferably selected from $Na^+$, $NH_4^+$, $½Zn^{2+}$, $½Mg^{2+}$, $½Ca^{2+}$ and the mixtures thereof, wherein $Na^+$ and $K^+$, and in particular $Na^+$, are preferred.

For the applications described herein, it is usually advantageous to lower the decomposition temperatures of the above-mentioned carboxylic acids, and in particular polycarboxylic acids. This is usually achieved by using sodium, potassium or ammonium bicarbonates. However, these have the disadvantage that inorganic salts remain in the foam after foaming, which are easily water-soluble and undesirably increase water absorption.

Surprisingly, the inventors have now found that the previously used carbonates can be replaced with urea derivatives, as described herein, whereby the above-described disadvantages can be overcome. In particular, the inventor found that the use of the described urea derivatives allows the decomposition temperature of the carboxylic acids, in particular polycarboxylic acids, to be lowered by as much as 40° C., and the decomposition rate to be increased at the same time. This yields foamed compositions that are distinguished by a fine, homogeneous pore structure, while exhibiting very low water absorption.

The urea derivatives used herein are those of formula (I)

where X denotes O or S;
$R_1$, $R_2$ and $R_3$ independently denote H, substituted or unsubstituted alkyl, substituted or unsubstituted heteroalkyl, substituted or unsubstituted cycloalkyl, substituted or unsubstituted aryl or —C(O)—$R_4$, where $R_4$ denotes H or substituted or unsubstituted alkyl.

"Substituted," as used herein, in connection with the alkyl or heteroalkyl functional groups which $R_1$, $R_2$, $R_3$ and $R_4$ can represent shall mean that the corresponding functional group is substituted with one or more substituents selected from the group consisting of —OR', —COOR', —NR'R", —C(=X)NR'R", —NR"C(=X)NR'R", halogen, unsubstituted $C_{6-14}$ aryl, unsubstituted $C_{2-14}$ heteroaryl comprising 1 to 5 heteroatoms selected from O, N and S, unsubstituted $C_{3-10}$ cycloalkyl, and unsubstituted $C_{2-10}$ heteroalicyclyl comprising 1 to 5 heteroatoms selected from O, N and S.

"Substituted," as used herein, in connection with the aryl and cycloalkyl functional groups which $R_1$, $R_2$ and $R_3$ can represent shall mean that the corresponding functional group is substituted with one or more substituents selected from the group consisting of —OR', —COOR', —NR'R", —C(=X)NR'R", —NR"C(=X)NR'R", halogen, unsubstituted $C_{1-10}$ alkyl and —$CH_2$ aryl, wherein the aryl group in the —$CH_2$ aryl group may, in turn, be substituted with —OR', —COOR', —NR'R", —C(=X)NR'R", —NR"C(=X)NR'R", halogen and unsubstituted $C_{1-20}$ alkyl.

R' and R" are selected, independently of one another, from H, unsubstituted $C_{1-10}$ alkyl, unsubstituted $C_{6-14}$ aryl, unsubstituted $C_{2-14}$ heteroaryl, unsubstituted $C_{3-10}$ cycloalkyl, unsubstituted $C_{2-10}$ heteroalicyclyl, alkyl aryl, aryl alkyl, heteroaryl alkyl and alkyl heteroaryl.

"Alkyl," as used herein, refers to linear or branched alkyl groups, such as methyl, ethyl, n-propyl, iso-propyl, n-butyl, n-pentyl, n-hexyl, n-heptyl, n-octyl, n-nonyl, n-decyl, n-undecyl, and n-dodecyl, and the linear $C_{14}$, $C_{16}$ and $C_{18}$ alkyl functional groups. In the various embodiments, the alkyl functional groups are short-chain $C_{1-4}$ alkyl functional groups, and in particular unsubstituted, linear $C_{1-4}$ alkyl functional groups. The alkyl functional groups can be substituted or unsubstituted, but are preferably unsubstituted. If they are substituted, the substituents are selected in particular from the above-described groups of substituents.

"Heteroalkyl" as used herein refers to alkyl functional groups as defined above, in which at least one carbon atom is replaced with a heteroatom, in particular N or O, and particularly preferably O.

"Aryl," as used herein, refers to aromatic groups that can comprise at least one aromatic ring, but also several condensed rings, such as phenyl, naphthyl, anthracenyl and the like. The aryl functional groups can be substituted or unsubstituted. If they are substituted, the substituents are selected from the above-described group.

"Heteroaryl," as used herein, refers to aryl functional groups as defined above, in which at least one carbon atom is replaced with a heteroatom, in particular N, S or O, and particularly preferably O.

"Halogen," as used herein, refers to fluorine, chlorine, bromine and iodine.

"Cycloalkyl," as used herein, refers to non-aromatic, cyclic hydrocarbons, and in particular cyclic alkyl or alkenyl functional groups as defined above, such as cyclopentyl, cyclohexyl and cyclohexenyl functional groups. If they are substituted, the substituents are selected from the above-described group.

"Heteroalicyclyl," as used herein, refers to cycloalkyl functional groups as defined above, in which at least one carbon atom is replaced with a heteroatom, in particular N, S or O, and particularly preferably O.

In various embodiments of the invention, X denotes O.

In various embodiments of the invention, $R_2$ and $R_3$ are selected from H and unsubstituted alkyl functional groups, in particular $C_{1-4}$ alkyl functional groups, such as methyl or ethyl. In various embodiments of the invention, $R_2$ and $R_3$ are not H, but in particular $C_{1-4}$ alkyl functional groups. In other embodiments, one of $R_2$ and $R_3$ is H, and the other is a $C_{1-4}$ alkyl functional group.

In various embodiments of the invention, $R_1$ is selected from H and unsubstituted alkyl functional groups, in particular $C_{1-4}$ alkyl functional groups, such as methyl or ethyl. In various other embodiments, $R_1$ is selected from substituted or unsubstituted aryl functional groups, in particular substituted or unsubstituted phenyl functional groups. If substituted, the phenyl functional groups are preferably substituted with halogen, —OR', in particular —OH or —O—($C_{1-4}$) alkyl, unsubstituted $C_{1-10}$ alkyl, or $CH_2$ aryl, in particular $CH_2$ phenyl, wherein the phenyl functional group may be substituted, and if it is substituted, it is preferably substituted with —NR"C(=X)NR'R".

In various embodiments, $R_1$ is selected in such a way that a bis-urea derivative of formula (II) is yielded:

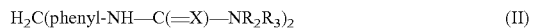

$$H_2C(phenyl\text{-}NH\text{—}C(=X)\text{—}NR_2R_3)_2 \quad (II)$$

where X, $R_2$ and $R_3$ are as defined above. In such compounds, all $R_2$ are preferably identical, and all $R_3$ are preferably identical.

Exemplary compounds of formula (I) that can be used according to the invention include, but are not limited to: urea (pure urea without substituents), N,N-dimethylurea, N,N-diethylurea, N,N'-dimethylurea, N,N'-diethylurea, 4-chlorophenyl-N,N-dimethylurea, 4,4'-methylenebis (phenyl dimethylurea), 1,1-dimethyl-3-(4-chlorophenyl)urea, 1,1-dimethyl-3-(3,4-dichlorophenyl)urea, isophorone bis (dimethylurea), 1,1-dimethyl-3-phenylurea, 1,1-dimethyl-3-(4-ethoxyphenyl)urea, 1,1'-(4-phenylene)-bis-(3,3-dimethylurea), 1,1-dimethyl-3-(2-hydroxyphenyl)urea and 1,1-dimethyl-3-(3-chloro-4-methylphenyl)urea. Urea, N, N-dimethylurea, N,N-diethylurea, N, N'-dimethylurea and N,N'-diethylurea are particularly preferred.

Mixtures of citric acid/citrate with the above-described urea derivatives are particularly preferred blowing agents.

Moreover, the blowing agents can comprise further additives, such as in particular calcium oxide, zeolite, zinc oxide and/or magnesium oxide. Even if carbonates are additionally used, the blowing agents or the compositions are preferably substantially free of hydrogen carbonates and carbonates. According to the invention, the expression "substantially free of" shall be understood to mean that the compositions comprise less than 1 wt. %, preferably less than 0.1 wt. %, and especially particularly preferably less than 0.01 wt. % of the respective substance, and in particular they do not comprise the respective substance.

In various embodiments, the thermally expandable compositions comprise the blowing agent in an amount of 0.1 to 40 wt. %, preferably 1 to 35 wt. %, preferably 5 to 35 wt. %, particularly preferably 10 to 30 wt. %, and especially particularly preferably 15 to 25 wt. %, based on the total composition. The percent by weight refers to the total composition prior to expansion, unless indicated otherwise.

In a preferred embodiment, the compositions comprise 0.02 to 6 wt. %, preferably 0.02 to 2 wt. %, still more preferably 0.1 to 1.5 wt. % of the urea derivative of formula (I), and 5 to 35 wt. %, preferably 10 to 25 wt. %, and most preferably 15 to 22 wt. % of the carboxylic acids, in particular polycarboxylic acid, and preferably citric acid. The percent by weight refers to the total composition prior to expansion, unless indicated otherwise. The weight ratio of urea derivative to carboxylic acid, in particular polycarboxylic acid, is preferably from 0.1:1 to 0.1:20, and preferably from 0.1:2 to 0.1:10.

In a particularly preferred embodiment, the blowing agent is introduced into the thermally expandable composition in the form of a masterbatch. A masterbatch shall be understood to mean a premixed composition of the blowing agent to be used, such as with a polymer, preferably polymer a) that is used. In addition to process-related advantages, this procedure has the advantage that the blowing agent can be distributed particularly homogeneously and gently, creating less heat from kneading/mixing. The blowing agent may thus be protected against undesirable decomposition. A particularly preferred masterbatch is one that comprises the at least one endothermic blowing agent, preferably the urea derivative and citric acid, and at least a portion of the peroxidically cross-linkable polymer a). In addition, the masterbatch may include further components, and in particular fillers, such as further polymers, talc, dyes and/or antioxidants.

The thermally expandable preparations are preferably substantially free of ADCA (azodicarbonamide) and/or OBSH (4,4'-oxybis(benzenesulfonic acid hydrazide)), and in particular free of exothermic blowing agents.

In addition to the endothermic blowing agent, the thermally expandable composition comprises at least one peroxidically cross-linkable polymer a) as a binding agent system.

In principle, all thermoplastic polymers and thermoplastic elastomers that can be peroxidically cross-linked may be used as peroxidically cross-linkable polymers. A person skilled in the art refers to polymers as being "peroxidically cross-linkable" if a hydrogen atom can be abstracted from the main chain or a side chain through the action of a radical starter, whereby a radical remains, which attacks other polymer chains in a second reaction step.

In a preferred embodiment, the at least one peroxidically cross-linkable copolymer a) is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-propylene-diene copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acrylic ester copolymers, and polyolefins, such as polyethylene or polypropylene.

According to the invention, a functionalized copolymer shall be understood to mean a copolymer that is provided with additional hydroxide groups, amine groups, carboxy groups, anhydride groups and/or acrylate groups Particularly advantageous within the meaning of the present invention are ethylene-vinyl acetate copolymers, functionalized ethylene-vinyl acetate copolymers, functionalized ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers, ethylene-butyl acrylate copolymers, and ethylene-(meth)acrylic acid copolymers. Ethylene-vinyl acetate copolymers and functionalized ethylene-vinyl acetate copolymers are especially particularly preferred, in particular ethylene-vinyl acetate copolymers comprising no further monomer units polymerized therein (pure ethylene-vinyl acetate copolymers).

Thermally expandable preparations that comprise at least one ethylene-vinyl acetate copolymer having a vinyl acetate content of 5 to 30 wt. %, in particular of 10 to 25 wt. %, and most particularly of 15 to 20 wt. %, based on the total mass the copolymers, are particularly preferred according to the invention.

Furthermore, it has proven advantageous if the thermally expandable preparation comprises a peroxidically cross-linkable polymer a), in particular an ethylene-vinyl acetate copolymer, having a melt flow index of 0.3 to 400 g/10 min, and in particular of 0.5 to 45 g/10 min. Peroxidically cross-linkable polymers a), and in particular ethylene-vinyl acetate copolymers, having a melt flow index of 1.5 to 25 g/10 min, in particular of 2 to 10 g/10 min, and most particularly of 2 to 8 g/10 min are particularly advantageous. It may be advantageous according to the invention if two or more polymers having differing melt flow indices are used in the thermally expandable preparations.

The melt flow index is determined in a capillary rheometer for this purpose, wherein the polymer is fused at 190° C. in a heatable cylinder and pressed through a defined nozzle (capillary) at a pressure created by the applied load (2.16 kg) (ASTM D1238). The exiting compound is ascertained as a function of the time.

In a preferred embodiment, such as for low temperature expanding formulations, the polymers a) have a melting point (determinable by way of DSC according to ASTM D3417) below the decomposition temperature of the endothermic blowing agent. The polymer a) preferably has a melting point below 100° C., and preferably between 90 and 60° C.

The thermally expandable preparations comprise especially at least 30 wt. % and preferably no more than 85 wt. %, in particular no more than 70 wt. %, of at least one peroxidically cross-linkable polymer a). Thermally expandable preparations that comprise 30 to 85 wt. %, in particular 40 to 75 wt. %, and preferably 45 to 65 wt. % of at least one peroxidically cross-linkable polymer a), each based on the total mass of the thermally expandable preparation, are particularly preferred.

The thermally expandable preparations comprise especially at least 30 wt. % and preferably no more than 85 wt. %, in particular no more than 70 wt. %, of at least one ethylene-vinyl acetate copolymer. Thermally expandable preparations that comprise 30 to 85 wt. %, in particular 40 to 75 wt. %, and preferably 45 to 65 wt. % of at least one ethylene-vinyl acetate copolymer, each based on the total mass of the thermally expandable preparation, are particularly preferred.

In various embodiments, a mixture of at least two polymers is used as polymer a), wherein the first polymer does not comprise glycidyl (meth)acrylate polymerized therein as a monomer and preferably is selected from those described above, and the second polymer comprises glycidyl (meth)acrylate polymerized therein as a monomer. The expression "(meth)acrylate," as used herein, comprises the respective corresponding acrylates and methacrylates. In various embodiments, the thermally expandable compositions comprise at least one second peroxidically cross-linkable polymer, which comprises glycidyl (meth)acrylate polymerized therein as a monomer in a content of 2 to 25 wt. %, based on the respective polymer. The glycidyl (meth)acrylate content of this polymer is preferably 2 to 20 wt. %, in particular 3 to 15 wt. %, and preferably 6 to 10 wt. %, based on the total mass of the copolymers. These polymers preferably comprise glycidyl methacrylate. The above-described peroxidically cross-linkable polymers are such suitable polymers, wherein the polymers comprise glycidyl (meth)acrylate as a unit. Particularly preferred are terpolymers that, in addition to glycidyl (meth)acrylate as a unit, preferably comprise monomers selected from the group consisting of ethylene, propylene, acrylate, such as preferably methyl (meth)acrylate, ethyl (meth)acrylate, propyl (meth)acrylate or butyl (meth)acrylate, styrene and vinyl acetate. Ethylene/(meth)acrylate/glycidyl (meth)acrylate terpolymers are especially particularly preferred, and in particular ethylene/methyl (meth)acrylate/glycidyl methacrylate, and ethylene/butyl (meth)acrylate/glycidyl methacrylate. Furthermore, it has proven advantageous if the melt flow index of this polymer, and in particular of the terpolymer, is 0.3 to 400 g/10 min, and in particular 0.5 to 45 g/10 min. Polymers, and in particular terpolymers, having a melt flow index of 1.5 to 25 g/10 min, and in particular of 2 to 15 g/10 min, are particularly advantageous.

In a preferred embodiment, such as for low-temperature expansion formulations, these polymers comprising glycidyl (meth)acrylate monomers polymerized therein have a melting point (determinable by way of DSC according to ASTM D3417) below the decomposition temperature of the endothermic blowing agent. The polymer preferably has a melting point below 100° C., preferably between 90 and 60° C., and preferably between 80 and 65° C.

It may be advantageous according to the invention if two or more, in particular two different, polymers comprising glycidyl (meth)acrylate monomers polymerized therein are used in the thermally expandable preparations. Two different terpolymers are advantageous in particular for improving the low water absorption. Preferably, an ethylene/methyl (meth)acrylate/glycidyl methacrylate and an ethylene/butyl (meth)acrylate/glycidyl methacrylate are present.

In these embodiments, the thermally expandable preparations can comprise especially at least 2 wt. % and preferably no more than 40 wt. %, in particular no more than 20 wt. % of at least one polymer comprising glycidyl (meth)acrylate polymerized therein as a monomer, in particular at least one terpolymer, in a content of 2 to 25 wt. %, in particular 3 to 20 wt. %, based on the respective polymer. Thermally expandable preparations that comprise 2 to 40 wt. %, in particular 5 to 30 wt. %, and preferably 7.5 to 22.5 wt. % of at least one peroxidically cross-linkable polymer comprising glycidyl (meth)acrylate polymerized therein as a monomer, each based on the total mass of the thermally expandable preparation, are particularly preferred. The preparations can additionally comprise at least one ethylene-vinyl acetate copolymer in the amounts described above.

The thermally expandable composition can comprise at least one tackifying resin as a further component. In particular, at least one tackifying resin is used in combination with above-described polymers comprising glycidyl (meth)acrylate monomers polymerized therein. The resin causes the tack of the non-expanded composition to be increased. This is advantageous especially for manual applications and can additionally improve overall adherence. These are in particular resins that have a softening point of less than 130° C. (measured according to what is known as the ring and ball method according to DIN 52011), in particular of less than 100° C., and preferably of less than 50° C. Advantageously, the resin has a softening point of −20 to 130° C., and in particular of 0 to 50° C. Preferably, at least one tackifying resin that is liquid at room temperature is used.

For example, the following are suitable: Rosin ester resins based on natural raw materials, which is to say so-called gum rosins, fully or partly hydrogenated rosin ester resins, maleated derivatives of these rosin ester resins, disproportionated derivatives, modified natural resins such as resin acids obtained from balsam resin, tall oil resin or wood rosin, for example fully saponified balsam resin, optionally modified terpene resins, in particular terpene copolymers or terpolymers such as styrene terpenes, alpha-methyl styrene terpenes, phenol-modified terpene resins and hydrogenated derivatives thereof, other styrene resins, other optionally phenol-modified alpha-methyl styrene resins, acrylic acid copolymers, preferably styrene/acrylic acid copolymers, and aromatic, aliphatic or cycloaliphatic hydrocarbon resins, in particular of the type C5, C9, C9/10, and the modified or hydrogenated derivatives thereof. Preferably, at least one aromatic, aliphatic or cycloaliphatic hydrocarbon resin, in particular of the type C5, C9, C9/10, and modified or hydrogenated derivatives thereof are used, in particular at least one aromatic hydrocarbon resin, and preferably a liquid C9/C10 aromatic hydrocarbon resin.

The tackifying resins are preferably used in an amount of 5 to 70 wt. %, preferably of 20 to 60 wt. %, and particularly preferably of 30 to 50 wt. %, in each case based on the total amount of the thermally expandable composition. In these embodiments comprising a tackifying resin, the thermally expandable preparations can comprise especially at least 2 wt. % and preferably no more than 40 wt. %, in particular no more than 20 wt. % of at least one polymer comprising glycidyl (meth)acrylate polymerized therein as a monomer, in particular at least one terpolymer, in a content of 2 to 25 wt. %, in particular 3 to 20 wt. %, based on the respective polymer. Thermally expandable preparations that comprise 2 to 40 wt. %, in particular 5 to 30 wt. %, and preferably 7.5 to 22.5 wt. % of at least one peroxidically cross-linkable polymer comprising glycidyl (meth)acrylate polymerized therein as a monomer, each based on the total mass of the thermally expandable preparation, are particularly preferred.

In addition to the above-described peroxidically cross-linkable polymers, the thermally expandable preparations can preferably comprise at least one low-molecular-weight multifunctional acrylate as a further component.

A "low-molecular-weight multifunctional acrylate" shall be understood to mean a compound that comprises at least two acrylate groups and has a molecular weight of less than 2400 g/mol, and preferably less than 800 g/mol. In particular compounds comprising two, three or more acrylate groups per molecule have proven to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butanediol dimethacrylate, 1,3-butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred low-molecular-weight acrylates comprising three or more acrylate groups are glycerol triacrylate, dipentaerythritol hexaacrylate, pentaerythritol triacrylate (TMM), tetramethylolmethane tetraacrylate (TMMT), trimethylolpropane triacrylate (TMPTA), pentaerythritol tetraacrylate, di(trimethylolpropane) tetraacrylate (TMPA), pentaerythritol tetraacrylate, trimethylolpropane trimethacrylate (TMPTMA), tri(2-acryloxyethyl) isocyanurate and tri(2-methacryloxyethyl) trimellitate, and the ethoxylated and propoxylated derivatives thereof, containing a maximum of 35 EO units and/or a maximum of 20 PO units.

Thermally expandable preparations comprising a low-molecular-weight multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane) tetraacrylate (TMPA) and pentaerythritol tetraacrylate are especially particularly preferred according to the invention.

In addition to the low-molecular-weight acrylates, the thermally expandable preparations can comprise further co-crosslinking agents, for example allyl compounds such as triallyl cyanurate, triallyl isocyanurate, triallyl trimesate, triallyl trimellitate (TATM), tetraallyl pyromellitate, the diallyl esters of 1,1,3-trimethyl-5-carboxy-3-(4-carboxyphenyl) indan, trimethylolpropane trimellitate (TMPTM) or phenylenedimaleimide.

It has proven to be particularly advantageous if the thermally expandable preparations comprise at least one low-molecular-weight multifunctional acrylate selected from triethylene glycol diacrylate, trimethylolpropane triacrylate (TMPTA) and trimethylolpropane trimethacrylate (TMPTMA).

The co-crosslinking agents, and preferably the low-molecular-weight multifunctional acrylates, are preferably present in the thermally expandable preparations in an amount of 0.2 to 2.5 wt. %, and in particular of 0.4 to 1.4 wt. %, in each case based on the total mass of the thermally expandable preparation.

The thermally expandable preparations comprise at least one peroxide as a curing system for the peroxidically cross-linkable polymers. In particular, the organic peroxides are suitable, such as ketone peroxides, diacyl peroxides, peresters, perketals and hydroperoxides. Particularly preferred are, for example, cumene hydroperoxide, t-butyl peroxide, bis(tert-butylperoxy)diisopropylbenzene, di(tert-butylperoxyisopropyl)benzene, dicumyl peroxide, t-butylperoxybenzoate, dialkyl peroxydicarbonate, diperoxy ketals (such as 1,1-di-tert-butylperoxy-3,3,5-trimethylcyclohexane), ketone peroxides (such as methyl ethyl ketone peroxides), 4,4-di-tert-butylperoxy-n-butyl valerates, and trioxepanes (such as 3,3,5,7,7-pentamethyl-1,2,4-trioxepane).

Particularly preferred peroxides are those sold commercially, for example, by Akzo Nobel or Pergan, such as 3,3,5,7,7-pentamethyl-1,2,4-trioxepane, 2,5-dimethyl-2,5-di(tert.butylperoxy)hexane, di-tert-butyl peroxide, 2,5-dimethyl-2,5-di(tert.-butylperoxy)hexane, tert-butylcumyl peroxide, di(2-tert-butylperoxyisopropyl)benzene, dicumyl peroxide, butyl-4,4-di(tert.butylperoxy)valerate, tert-butylperoxy-2-ethylhexyl carbonate, 1,1-di-(tert-butylperoxy)-3,3,5-trimethylcyclohexane, tert-butyl peroxybenzoate, di-(4-methylbenzoyl)peroxide and dibenzoyl peroxide.

It has furthermore proven advantageous if the peroxides used are substantially inert at room temperature and only activated upon heating to higher temperatures (for example, upon heating to temperatures between 130° C. and 240° C.). It is particularly advantageous when the peroxide used has a half-life of more than 60 minutes at 65° C., which is to say that, after the thermally expandable preparation containing the peroxide has been heated to 65° C. for 60 minutes, less than half of the peroxide used has decomposed. According to the invention, peroxides that, at 115° C., and in particular 130° C., have a half-life of at least 60 minutes can be particularly preferred.

At least one peroxide is particularly preferably selected from the group consisting of di(tert-butylperoxyisopropyl) benzene, dicumyl peroxide, 1,1-di-(tert-butylperoxy)-3,3,5-trimethylcyclohexane, 2,5-dimethyl-2,5-di(tert.-butylperoxy)hexane, dibenzoyl peroxide and di-tert-butyl-1,1,4,4-tetramethylbut-2-in-1,4-ylene diperoxide.

It is furthermore advantageous according to the invention if at least one peroxide is, or the peroxides are, used in a form applied onto a solid inert carrier, such as calcium carbonate and/or silica and/or kaolin.

Preferably, the at least one peroxide is, or the peroxides are, present in the thermally expandable preparations according to the invention in an amount of 0.05 to 4 wt. %, preferably in an amount of 0.05 to 2 wt. %, and in particular in an amount of 0.1 to 1 wt. %, in each case determined as the active substance content of peroxide based on the total mass of the thermally expandable preparation.

In addition to the above-mentioned components, the thermally expandable compounds can comprise further customary components, such as fillers, plasticizers, reactive diluents, auxiliary rheology substances, wetting agents, adhesion promoters, resins, anti-aging agents, stabilizers and/or color pigments.

Examples of suitable plasticizers are alkyl esters of dibasic acids (such as phthalate esters, adipic acid polyesters), technical white and process oils (paraffins), diaryl ethers, benzoates of polyalkylene glycols, citric acid esters (such as citric acid triethyl esters), organic phosphates and alkyl sulfonic acid esters of phenol or cresol.

Fillers that may be used include, for example, the various ground or precipitated chalks, calcium magnesium carbonates, talc, graphite, heavy spar, silicic acids or silica and in particular siliceous fillers, such as mica, for example in the form of chlorite, or siliceous fillers of the aluminum-magnesium-calcium silicate type, for example, wollastonite. Talc is a particular preferred filler. The fillers are preferably coated, especially with stearic acid or stearates. This positively influences the flow properties.

The fillers are preferably used in an amount of 0 to 60 wt. %, in particular of 0 to 15 wt. %, preferably 2 to 10 wt. %, and particularly preferably 3 to 8 wt. %, in each case based on the mass of the total thermally expandable composition.

Color-imparting components, and in particular black dyes based on graphite and/or carbon black, are preferably present in the thermally expandable compositions according to the invention in an amount of 0 to 2 wt. %, in particular of 0.1 to 0.8 wt. %, and especially particularly preferably 0.15 to 0.5 wt. %, in each case based on the mass of the total thermally expandable composition.

Sterically hindered phenols or mixtures thereof and/or sterically hindered thioethers and/or sterically hindered aromatic amines, diphosphonates, disulfides may be used as antioxidants or stabilizers, such as bis-(3,3-bis-4'-hydroxy-3-tert-butylphenyl)butanoic acid) glycol esters or 4-methylphenol, reaction product with dicyclopentadiene and isobutylene.

Antioxidants or stabilizers resins are preferably present in the thermally expandable compositions according to the invention in an amount of 0 to 5 wt. %, in particular of 0.1 to 2 wt. %, and preferably of 0.1 to 0.5 wt. %, in each case based on the mass of the total thermally expandable composition.

Desiccants such as calcium oxide and/or zeolites are preferably present in the thermally expandable compositions according to the invention in an amount of 0 to 5 wt. %, and in particular of 0.1 to 2.5 wt. %, in each case based on the mass of the total thermally expandable composition.

A preferred subject matter of the present invention is thermally expandable compositions, comprising
 a) 30 to 85 wt. % of at least one peroxidically cross-linking polymer,
 b) 0.05 to 4 wt. % of at least one peroxide, and
 c) 0.1 to 40 wt. % of at least one endothermic chemical blowing agent,
characterized in that the at least one endothermic chemical blowing agent comprises at least one carboxylic acid, and in particular at least one solid, optionally functionalized, polycarboxylic acid or the salt thereof, preferably in an amount of 5 to 35 wt. %, and at least one urea derivative of formula (I), preferably in an amount of 0.02 to 6 wt. %, in each case based on the total mass of the thermally expandable preparation prior to expansion.

A further preferred subject matter of the present invention is thermally expandable compositions, comprising
 a) 30 to 85 wt. %, in particular 40 to 75 wt. %, preferably 45 to 65 wt. % of at least one peroxidically cross-linking polymer,
 b) 0.05 to 4 wt. %, preferably 0.05 to 2 wt. %, in particular 0.1 to 1 wt. % of at least one peroxide, and
 c) 0.1 to 40 wt. %, preferably 1 to 35 wt. %, preferably 5 to 35 wt. %, particularly preferably 10 to 30 wt. %, and especially particularly preferably 15 to 25 wt. % of at least one endothermic chemical blowing agent,
characterized in that the at least one endothermic chemical blowing agent comprises at least one carboxylic acid, and in particular at least one solid, optionally functionalized, polycarboxylic acid or the salt thereof, preferably in an amount of 5 to 35 wt. %, preferably 10 to 25 wt. %, and most preferably 15 to 22 wt. %, and at least one urea derivative of formula (I), preferably in an amount of 0.02 to 6 wt. %, preferably 0.02 to 2 wt. %, still more preferably 0.1 to 1.5 wt. %, in each case based on the total mass of the thermally expandable preparation prior to expansion.

A further preferred subject matter of the present invention is thermally expandable compositions, comprising
 a) 30 to 85 wt. %, in particular 40 to 75 wt. %, preferably 45 to 65 wt. % of at least one ethylene-vinyl acetate copolymer, and 2 to 40 wt. %, in particular 5 to 30 wt. %, preferably 7.5 to 22.5 wt. % of at least one peroxidically cross-linkable polymer comprising glycidyl (meth)acrylate polymerized therein as a monomer,
 b) 0.05 to 4 wt. %, preferably 0.05 to 2 wt. %, in particular 0.1 to 1 wt. % of at least one peroxide, and
 c) 0.1 to 40 wt. %, preferably 1 to 35 wt. %, preferably 5 to 35 wt. %, particularly preferably 10 to 30 wt. %, and especially particularly preferably 15 to 25 wt. % of at least one endothermic chemical blowing agent,
characterized in that the at least one endothermic chemical blowing agent comprises at least one carboxylic acid, and in particular at least one solid, optionally functionalized, polycarboxylic acid or the salt thereof, preferably in an amount of 5 to 35 wt. %, preferably 10 to 25 wt. %, and most preferably 15 to 22 wt. %, and at least one urea derivative of formula (I), preferably in an amount of 0.02 to 6 wt. %, preferably 0.02 to 2 wt. %, still more preferably 0.1 to 1.5 wt. %, in each case based on the total mass of the thermally expandable preparation prior to expansion.

A further preferred subject matter of the present invention, which is suitable in particular for manual applications, is thermally expandable compositions, comprising
  a) 2 to 40 wt. %, in particular 5 to 30 wt. %, preferably 7.5 to 22.5 wt. % of at least one peroxidically cross-linkable polymer comprising glycidyl (meth)acrylate polymerized therein as a monomer, in particular a terpolymer,
  b) 0.05 to 6 wt. %, preferably 0.1 to 5 wt. %, in particular 1 to 4 wt. % of at least one peroxide, and
  c) 0.1 to 40 wt. %, preferably 1 to 35 wt. %, preferably 5 to 35 wt. %, particularly preferably 10 to 30 wt. %, and especially particularly preferably 15 to 25 wt. % of at least one endothermic chemical blowing agent,
  d) 5 to 70 wt. %, preferably of 20 to 60 wt. %, and particularly preferably of 30 to 50 wt. % of at least one tackifying resin, in particular at least one aromatic, aliphatic or cycloaliphatic hydrocarbon resin, and modified or hydrogenated derivatives thereof, in particular of at least one aromatic hydrocarbon resin, preferably of a liquid C9/C10 aromatic hydrocarbon resin, characterized in that the at least one endothermic chemical blowing agent comprises at least one carboxylic acid, and in particular at least one solid, optionally functionalized, polycarboxylic acid or the salt thereof, preferably in an amount of 5 to 35 wt. %, preferably 10 to 25 wt. %, and most preferably 15 to 22 wt. %, and at least one urea derivative of formula (I), preferably in an amount of 0.02 to 6 wt. %, preferably 0.02 to 2 wt. %, still more preferably 0.1 to 1.5 wt. %, in each case based on the total mass of the thermally expandable preparation prior to expansion.

The thermally expandable compositions according to the invention are preferably formulated so as to be solid at 22° C. According to the invention, a thermally expandable composition is referred to as being "solid" when the geometry of this composition does not deform under the influence of gravity within 1 hour, and in particular within 24 hours, at the indicated temperature.

The thermally expandable compositions according to the invention can be produced by mixing the selected components in any arbitrary suitable mixer, such as a kneader, a double-Z kneader, an internal mixer, a twin-screw mixer, a continuous mixer or an extruder, in particular a twin-screw extruder.

Although it may be advantageous to heat the components slightly to facilitate achieving a homogeneous, uniform compound, care must be taken to ensure that temperatures capable of activating the curing agents, the accelerators and/or the blowing agent are not reached. The resulting thermally expandable composition can be shaped immediately after being produced, for example by way of blow molding, pelletizing, injection molding methods, compression molding methods, stamping methods or extrusion.

The expansion of the thermally expandable composition takes place by way of heating, wherein the composition is heated to a certain temperature for a certain period of time sufficient to induce activation of the blowing agent. Depending on the components of the composition and the conditions of the production line, such temperatures are usually in the range of 110° C. to 240° C., and preferably 120° C. to 210° C., with a residence time of 10 to 90 minutes, and preferably 5 to 60 minutes.

In vehicle construction, it is particularly advantageous for the expansion of the compositions according to the invention to take place as the vehicle passes through the furnace for curing the cathodic dip coating, so that a separate heating step can be dispensed with.

The thermally expandable compositions of the present invention can be used in a wide range of support, filling, sealing and adhesive applications, for example in the field of baffle parts for sealing cavities in vehicles. However, use as a lining adhesive, for example in the door or roof area, is also conceivable. For such an intended purpose, the thermally expandable compositions according to the invention can be applied by way of direct extrusion. However, the compositions can also be brought to the site of application in the extruded form and pressed and/or partially fused on there. As a third alternative, it is also conceivable to apply the compositions as a co-extrudate. In this embodiment, according to the invention a second tacky composition is applied in a thin layer beneath the actual non-tacky shaped part made of the thermally expandable composition according to the invention. Within the scope of this embodiment, this second tacky layer is used to affix the shaped part in the body in white. The composition may furthermore be applied manually. In particular, compositions comprising a tackifying resin having high tack are suitable for manual application.

The thermally expandable compositions are thus particularly suitable for producing shaped bodies, in particular baffle parts used to seal cavities, which is to say for producing parts that are introduced into the cavities of vehicles, then expanded by heating while curing, so as to thereby seal the cavity as completely as possible.

The present invention additionally relates accordingly to a shaped body comprising a thermally expandable composition according to the invention. This may be a baffle part for sealing cavities of a component, for example, having a shape that is adapted to the cavity.

A "shape adapted to the cavity" according to the invention shall be understood to refer to all geometries of baffle parts which ensure complete sealing of the cavity after expansion. The shape of the baffle part can individually replicate the shape of the cavity and may have corresponding tips and/or rounded regions; in the case of the thermally expandable compositions according to the invention having high degrees of expansion, however, it may also suffice to introduce a suitably large amount in a variable shape, for example in the form of a bead or a strand/extrudate of the material cut to length, into the cavity to ensure complete sealing of the cavity after expansion.

Such baffle parts are usually produced from the thermally expandable compositions according to the invention by way of injection molding techniques. The thermally expandable compositions are heated to temperatures in the range of 70 to 120° C. and then injected into a suitably designed mold.

The shaped bodies according to the invention may be used in all products that have cavities. In addition to vehicles, these also include, for example, airplanes, rail vehicles, household appliances, furniture, buildings, walls, partitions or boats.

The present invention furthermore relates to a method for sealing and filling cavities in components, for reinforcing or stiffening components, in particular hollow components, and for bonding movable components using the compositions and shaped bodies described herein. The method is preferably a method for sealing cavities of a component, wherein a baffle part according to the invention is introduced into the cavity and then heated to a temperature above 110° C., so that the thermally expandable composition expands and seals the cavity.

The present invention moreover relates to the use of a shaped body or a baffle part according to the invention for sound insulating cavities in components and/or for sealing cavities in components against water and/or moisture.

The present invention additionally relates to the use of a shaped body according to the invention for reinforcing or stiffening components, in particular hollow components.

The following examples are intended to describe the invention in greater detail, wherein the selection of the examples is not intended to limit the scope of the subject matter of the invention. All quantity information described in relation to the compositions are parts by weight, unless indicated otherwise.

EXEMPLARY EMBODIMENTS

General Execution of Experiment/Production of the Formulations:

To produce the thermally expandable preparations according to the invention, the polymers were processed with fillers at room temperature in a kneader or, where necessary, by applying heat up to 150° C., to form a homogeneous dough. The further non-reactive components such as fillers, carbon black, stabilizers and plasticizers, where present, were then successively added and kneading was continued until the formulation was smooth.

All reactive components, such as accelerators, peroxides, activators and catalysts, zinc oxide, calcium oxide and blowing agents, were then added at less than 70° C. and slowly incorporated by way of kneading until the adhesive was homogeneously mixed. Some of the blowing agents were used in the form of a masterbatch.

Determination of the Expansion

To determine the expansion, test specimens having the approximate dimensions 20 mm×20 mm×3 mm were cut from the finished panels of the exemplary formulations and then inserted into a circulating air oven, which was heated to the temperatures listed in the tables (heating time approx. 7 to 10 min), and the test specimens were then left at this temperature for the period of time listed in in tables (including heating time). The expansion at 175° C. corresponds to the ideal conditions, which are achieved as part of curing in vehicle construction. The expansion at 160° C. simulates the under-baking conditions, while the expansion at 200° C. simulates the over-baking conditions.

The extent of the expansion [%] was determined by means of the water displacement method according to the formula:

$$\text{Expansion} = \frac{(m2 - m1)}{m1} \times 100$$

where:
m1=mass of the test specimen in the original state, in deionized water
m2=mass of the test specimen after baking, in deionized water.

Determination of the Water Absorption

To determine the water absorption, test specimens having the approximate dimensions 20 mm×20 mm×3 mm were prepared analogously to the method for determining the expansion and then expanded and cured in the circulating air oven at predefined temperatures analogously to the method for determining the expansion, as indicated in the tables. Thereafter, the test specimens thus expanded were conditioned for 24 hours under normal climate (23° C., 50% relative humidity); the mass determination "m" was carried out directly after conditioning.

For storage in a water bath, the test specimens were kept for 24 hours at 23° C. approximately 5 to 10 cm beneath the water surface in a container filled with water. After removal, the test specimens were drained, dried on the surface with an absorbent cloth and then weighed again $m_0$. Thereafter, the test specimens were again stored for 24 hours under normal climate (23° C., 50% relative humidity), and weighed again m24.

The water absorption [wt. %] was calculated according to the following equation:

$$\text{Water absorption} = \frac{m_i - m}{m} \times 100$$

m: mass of the test specimen prior to storage in water in the dip bath
$m_i$: mass of the test specimen after storage in water in the dip bath after the time i
i=0: measurement directly after removal
i=24: measurement after 24 hours under normal climate (23° C., 50% relative humidity)

Exemplary formulations were made using as components:

| | | |
|---|---|---|
| EVA polymer 1 | | EVA, 16.5 to 19.5% VA content, melting point 82 to 90° C., MFI 1.5 to 6 g/10 min (190° C., 2.16 kg) |
| Terpolymer 1 | | Terpolymer (GMA/EBA), reactive ethylene terpolymer, 9 wt. % Glycidyl methacrylate, 20 wt. % Butyl acrylate, melting point 72° C., MFI 8 g/10 min (190° C., 2.16 kg) |
| Terpolymer 2 | | Ethylene-acrylate-glycidyl methacrylate terpolymer, methyl acrylate content 24 wt. %, glycidyl methacrylate content 8 wt. %, melting point 65° C., MFI 6 g/10 min (190° C., 2.16 kg |
| If present, in the form of masterbatch | Citric acid | Particle size 10 to 15 μm |
| | NaHCO₃ | Particle size 10 to 15 μm |
| | Talc | Talc |
| | EVA polymer 2 | EVA (17 to 19% VA, melting point 85 to 89° C., MFI approx. 1.5 to 4 g/10 min, 190° C., 2.16 kg) |
| Peroxide 1 | | Di-(2-tert-butylperoxyisopropyl)benzene, 95% peroxide, 8.98% active oxygen content, half-life temperature 1 h = 146° C., t90 = 175° C. (rheometer t90 approximately 12 min) |

| | |
|---|---|
| Peroxide 2 | 2,5-dimethyl-2,5-di-(tert-butylperoxy)hexane, 45% peroxide, powder with chalk, 4.96% active oxygen content, half-life temperature 1 h = 147° C., t90 = 175° C. (rheometer t90 |
| Antioxidant | Bis[3,3-bis-(4'-hydroxy-3'-tert-butylphenyl)butanoic acid] glycol ester, molecular weight 794 g/mol, melting point 167 to 171° C. |

In the table below, Comp. Formula 1, 2, 3 are comparative formulations. Inventive Formula 1, 2, 3 are formulations according to the invention.

Exemplary Formulation (EVA-Based, Peroxide Cross-Linking)

| Substance designation/group (generic names) | Comp. Formula 1 | Comp. Formula 2 | Comp. Formula 3 | Inventive Formula 1 | Inventive Formula 2 | Inventive Formula 3 |
|---|---|---|---|---|---|---|
| EVA polymer 1 | 51.70 | 51.90 | 51.70 | 51.10 | 63.35 | 63.35 |
| Terpolymer 1 | 10.00 | 10.00 | 10.00 | 10.00 | 10.00 | 10.00 |
| Terpolymer 2 | 2.00 | 2.00 | 2.00 | 2.00 | 2.00 | 2.00 |
| Citric acid | 17.50 | 17.50 | 21.00 | 21.00 | 17.50 | 17.50 |
| NaHCO$_3$ | 3.50 | 3.50 | — | — | — | — |
| Talc | 5.25 | 5.25 | 5.25 | 5.25 | 5.25 | 5.25 |
| EVA polymer 2 | 8.75 | 8.75 | 8.75 | 8.75 | — | — |
| Peroxide 1 | — | 0.20 | — | — | — | — |
| Peroxide 2 | 1.00 | 0.60 | 1.00 | 1.00 | 1.00 | 1.00 |
| Antioxidant | 0.30 | 0.30 | 0.30 | 0.30 | 0.30 | 0.30 |
| Urea | — | — | — | 0.60 | 0.60 | — |
| N-N-dimethylurea | — | — | — | — | — | 0.6 |
| TOTAL | 100 | 100 | 100 | 100 | 100 | 100 |
| Expansion | | | | | | |
| 20 min, 160° C. | 511 | 527 | 168 | 849 | 679 | 825 |
| 25 min, 175° C. | 656 | 667 | 845 | 1174 | 921 | 947 |
| 40 min, 200° C. | 962 | 990 | 801 | 1093 | 1025 | 957 |
| Foam structure | Homogeneous, fine | Homogeneous, fine | Cracks in the surface | Homogeneous, fine | Homogeneous, fine | Homogeneous, fine |
| Water absorption 24 dip; directly after removal in % | | | | | | |
| 20 min, 160° C. | 6.0 | 4.8 | 3.4 | 4.5 | 4.8 | 4.3 |
| 25 min, 175° C. | 4.5 | 4.0 | 10.5 | 4.3 | 3.6 | 4.7 |
| Theoretical gas volume (% absolute) | 2520 | 2520 | 2520 | 2520 | 2100 | 2100 |
| Effective gas yield at 175° C. (% relative) | 26 | 26 | 34 | 47 | 44 | 45 |

The experiments according to the invention show that the use of urea derivatives and citric acid allows homogeneous, fine foams having low water absorption to be obtained. At the same time, the results with respect to the expansion behavior and the gas yield were able to be improved.

TGA Measurements

The following table shows TGA measurements of the pure substances and mixtures:

| | Decomposition temperature (° C.) | Decomposition rate |
|---|---|---|
| Citric acid | 170 | Very slow |
| Citric acid:urea (mass ratio 10:0.18) | 150 | Fast |
| Citric acid:urea (mass ratio 10:0.36) | 145 | Fast |
| Citric acid:urea (mass ratio 10:0.70) | 135 | Fast |
| Citric acid:bicarbonate (mass ratio 5:1) | 156 | Slow |

These experiments show that, compared to the use of citric acid alone, the use of urea derivatives and citric acid allows the decomposition temperature to be lowered considerably (in all experiments by up to 35° C.), and that even comparatively small amounts show a significantly more pronounced reduction in the decomposition temperature than with the use of hydrogen carbonate. At the same time, the decomposition rate is considerably increased compared to the two references.

Exemplary Embodiment 4, in Particular for Manual Application

As in the above exemplary embodiments, to produce the thermally expandable preparation 4 according to the invention, the polymers were processed with fillers at room temperature in a kneader or, where necessary, by applying heat up to 150° C., to form a homogeneous dough. The further non-reactive components such as fillers, carbon black, stabilizers and plasticizers, where present, were then successively added and kneading was continued until the formulation was smooth. All reactive components, such as accelerators, peroxides, activators and catalysts, zinc oxide, calcium oxide and blowing agents, were then added at less than 70° C. and slowly incorporated by way of kneading until the adhesive was homogeneously mixed. For this-purpose, 12.5 parts of an ethylene-acrylate-glycidyl methacrylate terpolymer (methyl acrylate content 24 wt. %, glycidyl methacrylate content 8 wt. %, melting point 60° C., MFI 6 g/10 min (190° C., 2.16 kg)), 3.2 parts carbon black, 8.3 parts of a pre-crosslinked butyl rubber, 45.5 parts of an aromatic C9/C10 carbon resin that is liquid at room temperature, 2.3 parts zinc oxide, 0.6 parts urea, 16 parts citric acid, 3 parts dicumyl peroxide, 3 parts TMPTMA, 0.3 parts antioxidant, and 5.3 parts polyisobutylene were used.

The resulting thermally expandable composition was flexible, tacky and stable at room temperature. Moreover, this composition was excellently suited for manual application. After foaming at 175° C. for 25 minutes, a fine homogeneous foam is obtained, which exhibits low water absorption. The resulting foam has particularly good adhesion on a wide variety of materials.

What is claimed is:

1. A thermally expandable composition, comprising:
   a) at least one peroxidically cross-linking polymer;
   b) at least one peroxide; and
   c) at least one endothermic chemical blowing agent comprising at least one carboxylic acid or salt thereof, and at least one urea derivative of formula (I)

   $$R_1\text{—NH—}C(=X)\text{—}NR_2R_3 \qquad (I),$$

wherein X denotes O or S; and
   $R_1$, $R_2$ and $R_3$ independently denote H, unsubstituted alkyl, substituted or unsubstituted cycloalkyl, substituted or unsubstituted aryl or —C(O)—$R_4$, where $R_4$ denotes H or substituted or unsubstituted alkyl;
   wherein the thermally expandable composition comprises less than 0.1 wt. % of hydrogen carbonates and carbonates.

2. The thermally expandable composition according to claim 1, wherein the at least one peroxidically cross-linking polymer a) is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-propylene-diene copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acrylic ester copolymers, and polyolefins.

3. The thermally expandable composition according to claim 2, wherein the at least one peroxidically cross-linking polymer a) is a copolymer selected from ethylene-vinyl acetate copolymers and functionalized ethylene-vinyl acetate copolymers.

4. The thermally expandable composition according to claim 3, wherein said at least one carboxylic acid comprises at least one solid, optionally functionalized, polycarboxylic acid or salt thereof.

5. The thermally expandable composition according to claim 4, wherein the at least one solid, optionally functionalized, polycarboxylic acid or the salt thereof is selected from hydroxy-functionalized or unsaturated dicarboxylic, tricarboxylic, tetracarboxylic or polycarboxylic acids and the salts thereof.

6. A thermally expandable composition, comprising:
   a) at least one peroxidically cross-linking polymer;
   b) at least one peroxide; and
   c) at least one endothermic chemical blowing agent comprising at least one carboxylic acid or salt thereof, and at least one urea derivative of formula (I)

   $$R_1\text{—NH—}C(=X)\text{—}NR_2R_3 \qquad (I),$$

wherein in the urea derivatives of formula (I):
   (i) X denotes O; and
   (ii) $R_2$ and $R_3$ are selected from H and unsubstituted alkyl functional groups, optionally comprising $C_{1-4}$ alkyl functional groups; and
   (iii) $R_1$ is selected from H; unsubstituted alkyl functional groups, optionally comprising $C_{1-4}$ alkyl functional groups; substituted or unsubstituted aryl functional groups, optionally comprising substituted or unsubstituted phenyl functional groups.

7. The thermally expandable composition according to claim 1, wherein the urea derivative is a bis-urea derivative according to formula (II):

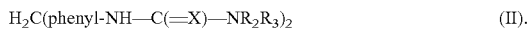
   $$H_2C(\text{phenyl-NH—}C(=X)\text{—}NR_2R_3)_2 \qquad (II).$$

8. The thermally expandable composition according to claim 1, wherein the urea derivative is selected from: urea; N,N-dimethylurea; N,N-diethylurea; N,N'-dimethylurea; N,N'-diethylurea; 4-chlorophenyl-N,N-dimethylurea; 4,4'-methylene bis(phenyldimethyl urea); 1,1-dimethyl-3-(4-chlorophenyl)urea; 1,1-dimethyl-3-(3,4-dichlorophenyl)urea; isophorone bis(dimethylurea); 1,1-dimethyl-3-phenylurea; 1,1-dimethyl-3-(4-ethoxyphenyl)urea; 1,1'-(4-phenylene)-bis-(3,3-dimethylurea); 1,1-dimethyl-3-(2-hydroxyphenyl)urea and 1,1-dimethyl-3-(3-chloro-4-methylphenyl)urea.

9. The thermally expandable composition according to claim 8, wherein the urea derivative is selected from: urea; N,N-dimethylurea; N,N-diethylurea; N,N'-dimethylurea and N,N'-diethylurea.

10. The thermally expandable composition according to claim 1, further comprising at least one tackifying resin.

11. The thermally expandable composition according to claim 10, wherein the at least one tackifying resin comprises at least one aromatic, aliphatic or cycloaliphatic hydrocarbon resin and/or modified or hydrogenated derivatives thereof.

12. The thermally expandable composition according to claim 10, wherein the at least one tackifying resin comprises at least one liquid C9/C10 aromatic hydrocarbon resin.

13. A shaped body comprising a thermally expandable composition according to claim 1.

14. A method of sealing and filling cavities in components, of reinforcing or stiffening components, of bonding movable components and combinations thereof comprising steps of:
    1) applying a thermally expandable composition according to claim 1, optionally said thermally expandable composition being a shaped body, to a site of application on a component or in a cavity of a component; and
    2) subsequently heating the thermally expandable composition to a selected temperature for a period of time selected such that activation of the blowing agent is thereby induced.

15. The method according to claim 14 wherein the thermally expandable composition is present as the shaped body and step 1) comprises introducing the shaped body into the cavity of the component, and step 2) comprises heating to a temperature greater than 110° C., such that the thermally expandable composition expands and seals, fills, reinforces or stiffens the component.

16. The method according to claim 15 wherein in step 1) the site of application is the cavity of the component and wherein the shaped body has a shape that is adapted to the cavity, such that in step 2) the thermally expandable composition expands and seals and/or fills the component.

17. A product comprising a component according to the method of claim 14 wherein said product is a vehicle, airplane, rail vehicle, household appliance, furniture, building, wall, partition or boat.

18. The thermally expandable composition of claim 1, wherein the at least one urea derivative of formula (I) and the at least one carboxylic acid or salt thereof is present at a ratio of 0.1:1 to 0.1:20.

19. The thermally expandable composition of claim 1, wherein the at least one urea derivative of formula (I) and the at least one carboxylic acid or salt thereof is present at a ratio of 0.1:2 to 0.1:10.

20. A thermally expandable composition, comprising:
a) at least one peroxidically cross-linking polymer;
b) at least one peroxide; and
c) at least one endothermic chemical blowing agent,
wherein the at least one endothermic chemical blowing agent comprises at least one solid, optionally functionalized, polycarboxylic acid or the salt thereof, and at least one urea derivative of formula (I)

$$R_1\text{—NH—C}(\text{=X})\text{—NR}_2R_3 \quad (I),$$

where X denotes O or S,
$R_1$, $R_2$ and $R_3$ independently denote H, substituted or unsubstituted alkyl, substituted or unsubstituted heteroalkyl, substituted or unsubstituted cycloalkyl, substituted or unsubstituted aryl or —C(O)—R4, where R4 denotes H or substituted or unsubstituted alkyl; wherein the weight ratio of the urea derivative to the solid polycarboxylic acid is from 0.1:1 to 0.1:20; and the thermally expandable composition comprises less than 0.1 wt. % of hydrogen carbonates and carbonates.

* * * * *